United States Patent
Wade et al.

(10) Patent No.: US 11,665,241 B1
(45) Date of Patent: May 30, 2023

(54) SYSTEMS AND METHODS FOR DYNAMIC FEDERATED API GENERATION

(71) Applicant: Itential, Inc., Atlanta, GA (US)

(72) Inventors: Christopher Allen Wade, Atlanta, GA (US); Michael Gettys Wymer, Atlanta, GA (US)

(73) Assignee: Itential, Inc., Atlanta, GA (US)

( * ) Notice: Subject to any disclaimer, the term of this patent is extended or adjusted under 35 U.S.C. 154(b) by 0 days.

(21) Appl. No.: 16/220,622

(22) Filed: Dec. 14, 2018

Related U.S. Application Data (60) Provisional application No. 62/611,019, filed on Dec. 28, 2017.

(51) Int. Cl.
*H04L 67/141* (2022.01)
*H04L 67/02* (2022.01)
(Continued)

(52) U.S. Cl.
CPC .............. *H04L 67/141* (2013.01); *G06F 9/50* (2013.01); *G06F 9/541* (2013.01); *H04L 41/08* (2013.01); *H04L 45/02* (2013.01); *H04L 67/02* (2013.01)

(58) Field of Classification Search
CPC ....... H04L 67/141; H04L 45/02; H04L 67/02; H04L 41/08; H04L 41/0803;
(Continued)

(56) References Cited

U.S. PATENT DOCUMENTS

| | | | | |
|---|---|---|---|---|
| 7,383,253 B1* | 6/2008 | Tsimelzon | ........ | G06F 16/24568 707/610 |
| 7,594,217 B2* | 9/2009 | Beisiegel | .............. | G06F 16/335 717/107 |
| 9,921,894 B1* | 3/2018 | O'Kennedy | ............ | G06F 9/541 |
| 10,509,764 B1* | 12/2019 | Izenberg | ................. | H04L 69/22 |

(Continued)

OTHER PUBLICATIONS

Braswell, Bryon, Siegel, Marc, Wu, Le Gang, "Enabling the On Demand Store with IBM Store Integration Framework;" IP.com accessed Jun. 15, 2020; Publication Date: Feb. 2, 2007 (Year: 2007).*

(Continued)

*Primary Examiner* — John A Follansbee
*Assistant Examiner* — Fadi Haj Said
(74) *Attorney, Agent, or Firm* — Morris, Manning & Martin, LLP; Daniel E. Sineway, Esq.; Daniel T. Begasse (57) ABSTRACT

Systems and methods for dynamically generating federated application programming interfaces (APIs) are disclosed. Network components, such as servers and other devices, transmit and receive electronic communications according to standards and protocols native to those network components. Aspects of the present system detect those native standards and furthermore generate a federated API that allows for the content of the electronic communications to be represented in a universal format. Accordingly, the universal format may be used for network communications between system components and modules that may not have otherwise been compatible to receive the communications, (Continued)

EXEMPLARY FEDERATED API GENERATION PROCESS and furthermore the communications may be transformed back to their respective native formats upon reaching their destinations. The present system generates models for representing these APIs, where instances of the models may be instantiated for particular API calls, as detected. In this way, many different APIs may be modeled according to a single federated format.

14 Claims, 4 Drawing Sheets

(51) Int. Cl.
*G06F 9/50* (2006.01)
*G06F 9/54* (2006.01)
*H04L 45/02* (2022.01)
*H04L 41/08* (2022.01)

(58) Field of Classification Search
CPC ............. H04L 41/0806; H04L 41/0813; H04L 41/082; H04L 41/0823; H04L 41/083; H04L 41/0833; H04L 41/0836; H04L 41/084; H04L 41/0843; H04L 41/0846; H04L 41/85; H04L 41/0856; H04L 41/0859; H04L 41/0863; H04L 41/0866; H04L 41/0869; H04L 41/0873; H04L 41/0876; H04L 41/0879; H04L 41/0883; H04L 41/0886; H04L 41/0889; H04L 41/0893; H04L 41/0896; G06F 9/541; G06F 9/50

See application file for complete search history.

(56) References Cited

U.S. PATENT DOCUMENTS

| | | | |
|---|---|---|---|
| 2006/0122958 A1* | 6/2006 | Beisiegel | G06F 16/335 |
| 2009/0204591 A1* | 8/2009 | Kaksonen | G06F 11/3684 |
| | | | 717/124 |
| 2013/0339488 A1* | 12/2013 | Eberlein | G06F 9/54 |
| | | | 709/219 |
| 2014/0344340 A1* | 11/2014 | Tang | G06F 9/5011 |
| | | | 709/203 |
| 2015/0347486 A1* | 12/2015 | Julia | G06N 3/08 |
| | | | 707/736 |
| 2016/0092339 A1* | 3/2016 | Straub | G06F 9/44521 |
| | | | 717/124 |
| 2016/0119426 A1* | 4/2016 | Van De Poel | H04L 67/14 |
| | | | 709/213 |
| 2016/0316016 A1* | 10/2016 | Arenas | G06F 9/54 |
| 2016/0352867 A1* | 12/2016 | Subbarayan | H04L 45/58 |
| 2017/0126472 A1* | 5/2017 | Margalit | G06F 11/34 |
| 2018/0225732 A1* | 8/2018 | Doshi | G06Q 30/06 |
| 2018/0276053 A1* | 9/2018 | Kesavan | G06F 9/541 |
| 2019/0094827 A1* | 3/2019 | Park | G05B 15/02 |
| 2019/0132264 A1* | 5/2019 | Jafar Ali | G06F 40/56 |
| 2019/0156927 A1* | 5/2019 | Virkar | G06F 16/248 |

OTHER PUBLICATIONS

Lee A. Craig, "Cloud Federation Management and Beyond: Requirements, Relevant Standards and Gaps" https://ieeexplore.ieee.org/abstract/document/7420530. Feb. 26, 2016 (Year: 2016).*

Shreyas M M, "Federated Cloud Services using Virtual API Proxy Layer in a Distributed Cloud Environment" https://ieeexplore.ieee.org/document/8441196, Dec. 14, 2017 (Year: 2017).*

Netbeans, "Java Hierarchy API" Jul. 11, 2007, https://netbeans.org/download/5_5_1/javadoc/org-openide-src/org/openide/src/doc-files/api.html (Year: 2007).*

* cited by examiner

FIG. 1: EXEMPLARY SYSTEM DIAGRAM

FIG. 2: EXEMPLARY ENTITY HIERARCHY STRUCTURE

FIG. 3: EXEMPLARY FEDERATED API GENERATION PROCESS

FIG. 4: EXEMPLARY API ROUTING PROCESS

SYSTEMS AND METHODS FOR DYNAMIC FEDERATED API GENERATION

CROSS REFERENCE TO RELATED APPLICATIONS

This application claims the benefit of, and priority to, U.S. Provisional Patent Application No. 62/611,019, filed on Dec. 28, 2017, and entitled "SYSTEMS AND METHODS FOR DYNAMIC FEDERATED API GENERATION," the disclosure of which is incorporated by reference in its entirety as if the same were fully set forth herein.

TECHNICAL FIELD

The present systems and methods relate generally to generating application programming interfaces, and more particularly to dynamically generating application programming interfaces based on a plurality of computer hardware and software modules for improving computer network communications.

BACKGROUND

Modern computing networks generally include various hardware and software components included within the network that each contribute to the network's overall operability, performance, and functionality. These various hardware and software components generally communicate throughout the network via application programming interfaces (APIs). Typically, each component in a network is mapped to a corresponding API designed for that particular component. Therefore, in a conventional computer network including a plurality of components, the network must be configured to execute a plurality of APIs to support those components. Traditionally, and in conventional networks, network components are manually configured and mapped to their corresponding APIs, which is not only cumbersome and time consuming but is also problematic if a network component fails, is modified, etc. Therefore, there exists a long-felt but unresolved need for systems and methods for dynamically generating federated APIs based on computer network components.

BRIEF SUMMARY OF DISCLOSURE

The present systems and methods relate generally to dynamically generating federated APIs based on particular components included in a computer network, according to various aspects of the present disclosure. Typical computer networks include a plurality of components such as servers, routers, switches, edge devices, etc. Accordingly, each component in a computer network may transmit and receive data according to a unique standard, format, or API. For example, a router manufactured by Cisco Systems and a router manufactured by Nokia Networks may both be manufactured to route internet traffic; however, each router may be configured with unique requirements for receiving and transmitting the internet traffic (e.g., each router operates according to different and unique APIs). The implementation of different and unique APIs for each component in a network requires conventional networks to be manually configured, including manually linking the components to the appropriate destination(s) or application(s) they service. The manual configuration of the APIs and the applications they service is a cumbersome process, inefficient for network traffic, and generally exposes the functionality of the components to network vulnerabilities and failures. The present systems and methods aim to solve this problem with a technical solution including an API integration module operable to detect active components or devices in a computer network, determine the APIs used by each detected component or device, and further generate a federated API to be used for intra-network communications, thereby reducing the need for each network component to be reliant on its own API.

According to various aspects of the present disclosure, the system disclosed herein includes a combination of hardware and software configured to detect components in a computer network. Referring to the example above, consider a computer network including one Cisco Systems router and one Nokia Networks router. In one embodiment, the present system is configured to ingest the APIs from each of these components and use the ingested APIs to generate a language-agnostic (e.g., JSON) representation of the ingested API. Within the system, API messages from both the Cisco Systems router and the Nokia router will be converted to the language-agnostic format until the API messages are received at their respective destinations, where they are converted back to the particular required API format. The systems and methods described herein allow for a computer network to improve reliability, increase scalability, and also generally maximize overall network performance.

In various embodiments, the present disclosure discusses a system for enhancing computer networks via distributed API federation, including: an entity database including one or more entities corresponding to frameworks for modeling device APIs; and an API integration module operatively connected to one or more network system components and one or more applications, wherein the one or more applications are configured to direct electronic communications in the form of API calls to the one or more network system components through the API integration module, wherein the API integration module further includes: a business logic module that (i) receives an API call from a respective application of the one or more applications and (ii) generates a language-agnostic representation of the API call; a broker module that (i) receives the language-agnostic representation of the API call from the business logic module, (ii) retrieves the one or more entities from the entity database, wherein the one or more entities are representative of the one or more network system components and are instantiated based on ingested APIs associated with the one or more network system components, and (iii) determines at least one entity appropriate for addressing the API call based on the one or more entities; and one or more adapter modules operatively mapped to each of the one or more network system components, the one or more adapter modules operable to (i) receive the language-agnostic representation of the API call from the broker module, (ii) transform the language-agnostic representation of the API call into a format acceptable by at least one network system component corresponding to the at least one entity appropriate for addressing the API call, and (iii) transmit the transformed API call to the at least one network system component.

According to various aspects of the present disclosure, the broker module described above is further operable to: determine one or more compatible adapter modules, wherein the one or more compatible adapter modules are operable to address the language-agnostic representation of the API call type; determine, from the one or more compatible adapter modules, one or more specialized adapter modules for addressing a particular action associated with the language-agnostic representation of the API call; and determine an optimized adapter module from the one or more specialized adapter modules, wherein the optimized adapter module is operable to address the language-agnostic representation of the API call and a set of parameters associated with the language-agnostic representation of the API call.

In particular embodiments, the one or more entities are further representative of service models and topologies. In certain embodiments, the language-agnostic representation of the API call includes an API action and a corresponding entity. In one embodiment, the language-agnostic representation of the API call includes a JSON representation. In various embodiments, the one or more network system components are physical or virtual.

According to various aspects of the present disclosure, a particular entity of the one or more entities may correspond to more than one of the one or more adapter modules. Furthermore, in certain embodiments, the particular entity is mapped to the one or more adapter modules via an adapter router in the broker module. In a particular embodiment, the frameworks are extendable, thereby allowing the one or more entities to dynamically configure to newly ingested APIs, wherein dynamically configuring to newly ingested APIs includes extending the frameworks to include additional service models and/or topologies within the one or more entities.

In one embodiment, the present disclosure discusses a method for routing API calls between a plurality of applications and a plurality of network system components via an API integration module, the API integration module including a processor configurable to execute the steps of: receiving an API call from one of the plurality of applications, wherein the API call includes an electronic request for action at one of the plurality of network system components; generating a language-agnostic representation of the API call based at least on the electronic request for action; based on the language-agnostic representation of the API call, determining at least one respective network system component compatible to receive the API call; transforming the language-agnostic representation of the API call into a format acceptable by the at least one respective network system component; and routing the transformed API call to the at least one respective network system component. In various embodiments, determining the at least one respective network system component compatible to receive the API call further includes determining that the at least one respective network system component is configured to execute the API call. In particular embodiments, the language-agnostic representation of the API call is a JSON representation. In certain embodiments, the one or more network system components are physical or virtual.

In various embodiments, the present disclosure discusses a method for enhancing computer networks via distributed API federation, including the steps of: receiving a request, from one or more network system components, at an API integration module for generation of a new API interface; retrieving one or more entity frameworks for instantiating entities representative of the one or more network system components; ingesting one or more unique API calls from the one or more network system components via one or more adapter modules in the API integration module, wherein the one or more adapter modules are operable to convert the one or more unique API calls from the one or more network system components into a language-agnostic format; instantiating one or more entities representative of the one or more network system components based on the one or more entity frameworks and the one or more unique API calls; and generating the new API interface, wherein the new API interface includes at least an API action and a corresponding respective entity of the one or more entities, wherein the API action indicates an intent of a respective API call and the corresponding respective entity is representative of a respective network system component of the one or more network components operable to address the API action.

In particular embodiments, the one or more entities are further representative of service models and/or topologies. In certain embodiments, the one or more entity frameworks are retrieved from an entity database. In one embodiment, the one or more entity frameworks are extendable, thereby allowing the one or more entities to dynamically configure to newly ingested unique APIs, wherein dynamically configuring to newly ingested unique APIs includes extending the one or more entity frameworks to include additional service models and/or topologies within the one or more entities. According to various aspects of the present disclosure, the language-agnostic format is a JSON representation.

In one embodiment, the one or more network system components are physical or virtual. In particular embodiments, a particular entity of the one or more entities may correspond to more than one of the one or more adapter modules. In certain embodiments, the particular entity is mapped to the one or more adapter modules via an adapter router. According to various aspects of the present disclosure, the one or more entities are instantiated in part based on component parameters included in the language agnostic format.

In various embodiments, the disclosure herein discusses a system for enhancing computer networks via distributed API federation, the system including: an entity database including one or more entities corresponding to frameworks for modeling device APIs; and an API integration module operatively connected to one or more network system components and one or more applications, wherein the one or more applications are configured to direct electronic communications in the form of API calls to the one or more network system components through the API integration module, wherein the API integration module further includes: a business logic module that (i) receives an API call from a respective application of the one or more applications and (ii) generates a language-agnostic representation of the API call; a broker module that (i) receives the language-agnostic representation of the API call from the business logic module, (ii) retrieves the one or more entities from the entity database, wherein the one or more entities are representative of the one or more network system components and are instantiated based on ingested APIs associated with the one or more network system components, and (iii) determines at least one entity appropriate for addressing the API call based on the one or more entities; and one or more adapter modules operatively mapped to each of the one or more network system components, the one or more adapter modules operable to (i) receive the language-agnostic representation of the API call from the broker module, (ii) transform the language-agnostic representation of the API call into a format acceptable by at least one network system component corresponding to the at least one entity appropriate for addressing the API call, and (iii) transmit the transformed API call to the at least one network system component.

In certain embodiments, the broker module is further operable to: determine one or more compatible adapter modules, wherein the one or more compatible adapter modules are operable to address the language-agnostic representation of the API call type; determine, from the one or more compatible adapter modules, one or more specialized adapter modules for addressing a particular action associated with the language-agnostic representation of the API call; and determine an optimized adapter module from the one or more specialized adapter modules, wherein the optimized adapter module is operable to address the language-agnostic representation of the API call and a set of parameters associated with the language-agnostic representation of the API call.

According to various aspects of the present disclosure, the one or more entities are further representative of service models and topologies. In a particular embodiment, the language-agnostic representation of the API call includes an API action and a corresponding entity. In various embodiments, the language-agnostic representation of the API call includes a JSON representation. In one embodiment, the one or more network system components are physical or virtual.

In certain embodiments, a particular entity of the one or more entities may correspond to more than one of the one or more adapter modules. Furthermore, in some embodiments, the particular entity is mapped to the one or more adapter modules via an adapter router in the broker module. Additionally, in various embodiments, the frameworks are extendable, thereby allowing the one or more entities to dynamically configure to newly ingested APIs, wherein dynamically configuring to newly ingested APIs includes extending the frameworks to include additional service models and/or topologies within the one or more entities.

In various embodiments, the present disclosure discusses a method for routing API calls between a plurality of applications and a plurality of network system components via an API integration module, the API integration module including a processor configurable to execute the steps of: receiving an API call from one of the plurality of applications, wherein the API call includes an electronic request for action at one of the plurality of network system components; generating a language-agnostic representation of the API call based at least on the electronic request for action; based on the language-agnostic representation of the API call, determining at least one respective network system component compatible to receive the API call; transforming the language-agnostic representation of the API call into a format acceptable by the at least one respective network system component; and routing the transformed API call to the at least one respective network system component.

In certain embodiments, determining the at least one respective network system component compatible to receive the API call further includes determining that the at least one respective network system component is configured to execute the API call. In a particular embodiment, the language-agnostic representation of the API call is a JSON representation. In one embodiment, the one or more network system components are physical or virtual.

According to various aspects of the present disclosure, the method further includes the steps of: receiving a request, from one or more network system components, at an API integration module for generation of a new API interface; retrieving one or more entity frameworks for instantiating entities representative of the one or more network system components; ingesting one or more unique API calls from the one or more network system components via one or more adapter modules in the API integration module, wherein the one or more adapter modules are operable to convert the one or more unique API calls from the one or more network system components into a language-agnostic format; instantiating one or more entities representative of the one or more network system components based on the one or more entity frameworks and the one or more unique API calls; and generating the new API interface, wherein the new API interface includes at least an API action and a corresponding respective entity of the one or more entities, wherein the API action indicates an intent of a respective API call and the corresponding respective entity is representative of a respective network system component of the one or more network components operable to address the API action.

In particular embodiments, the one or more entities are further representative of service models and/or topologies. In one embodiment, the one or more entity frameworks are retrieved from an entity database. In certain embodiments, the one or more entity frameworks are extendable, thereby allowing the one or more entities to dynamically configure to newly ingested unique APIs, wherein dynamically configuring to newly ingested unique APIs includes extending the one or more entity frameworks to include additional service models and/or topologies within the one or more entities. In certain embodiments, the language-agnostic format is a JSON representation.

According to various aspects of the present disclosure, the one or more network system components are physical or virtual. Furthermore, in one embodiment, a particular entity of the one or more entities may correspond to more than one of the one or more adapter modules. Additionally, in some embodiment, the particular entity is mapped to the one or more adapter modules via an adapter router. In a particular embodiment, the one or more entities are instantiated in part based on component parameters included in the language agnostic format.

These and other aspects, features, and benefits of the claimed embodiments(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure relate generally to dynamically generating federated APIs based on particular components included in a computer network, according to various aspects of the present disclosure. Typical computer networks include a plurality of components such as servers, routers, switches, edge devices, etc. Accordingly, each component in a computer network may transmit and receive data according to a unique standard, format, or API. For example, a router manufactured by Cisco Systems and a router manufactured by Nokia Networks may both be manufactured to route internet traffic; however, each router may be configured with unique requirements for receiving and transmitting the internet traffic (e.g., each router operates according to different and unique APIs). The implementation of different and unique APIs for each component in a network requires conventional networks to be manually configured, including manually linking the components to the appropriate destination(s) or application(s) they service. The manual configuration of the APIs and the applications they service is a cumbersome process, inefficient for network traffic, and generally exposes the functionality of the components to network vulnerabilities and failures. The present systems and methods aim to solve this problem with a technical solution including an API integration module operable to detect active components or devices in a computer network, determine the APIs used by each detected component or device, and further generate a federated API to be used for intra-network communications, thereby reducing the need for each network component to be reliant on its own API.

According to various aspects of the present disclosure, the system disclosed herein includes a combination of hardware and software configured to detect components in a computer network. Referring to the example above, consider a computer network including one Cisco Systems router and one Nokia Networks router. In one embodiment, the present system is configured to ingest the APIs from each of these components and use the ingested APIs to generate a language-agnostic (e.g., JSON) representation of the ingested API. Within the system, API messages from both the Cisco Systems router and the Nokia router will be converted to the language-agnostic format until the API messages are received at their respective destinations, where they are converted back to the particular required API format. The systems and methods described herein allow for a computer network to improve reliability, increase scalability, and also generally maximize overall network performance.

Figure 1:
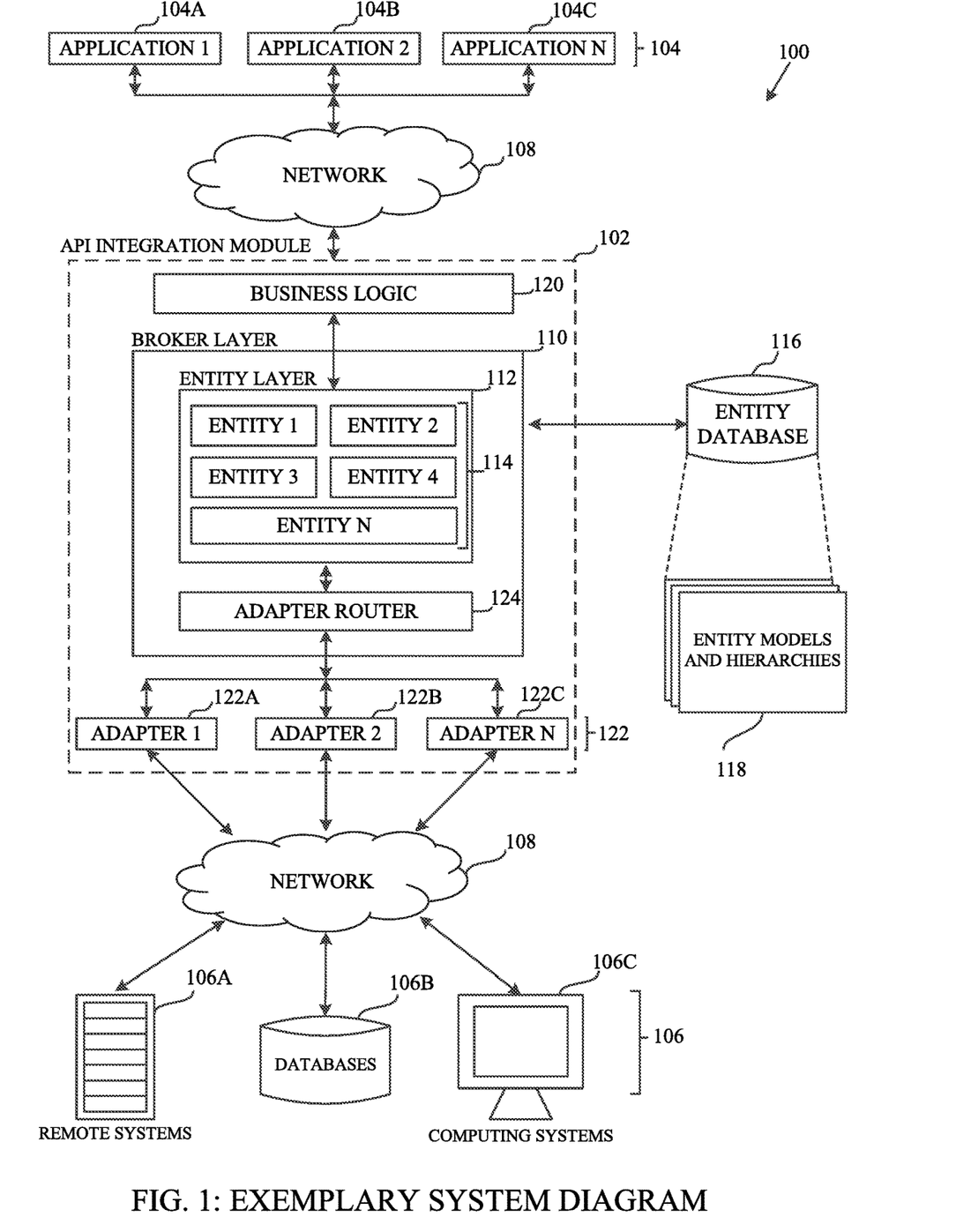
FIG. 1 is an exemplary system diagram, according to one aspect of the present disclosure.

Referring now to the drawings, FIG. 1 illustrates a diagram of the exemplary system 100, according to one aspect of the present disclosure. As shown in the present embodiment, the disclosed system may be integrated into a computing network at a business or other organization for supporting business-wide emails, telecommunications, integration with various applications, etc. As will be discussed in greater detail herein, the disclosed system allows for a plurality of components in a computing network, that each may communicate via unique APIs, to transmit and receive communications and data through the system described herein by means of a federated, or system-universal, API. According to various embodiments of the present disclosure, the exemplary system 100 implements a model-based programming approach to provide a common framework, schema, or federated API, for system-wide communication. Accordingly, embodiments of the disclosed system may be provided via a SaaS package, a combination of hardware and software, a web-based network solution, etc. In particular embodiments, the entire system 100 may operate locally to the hosting organization's computing network, remote to the computing network, or various components of the disclosed system may operate divided between the remote and local environment. In certain embodiments, the system 100 may enable "plug-and-play" functionality within a computer network. In one embodiment, the plug-and-play functionality allows for components to be added, removed, or swapped without the need to configure or reconfigure the components. As is mentioned above, in conventional networks configuring components often includes manually linking the components and their APIs to the applications they service, which is a cumbersome task. Conventional networks may also require a temporary shut down or general offline status when registering, adding, removing, or swapping network components. The system 100 described herein, and the plug-and-play functionality it provides, solves this issue by generating a federated API based on the one or more unique APIs detected within the computer network, and further dynamically extending the API functionality in response to changes in the network components.

In one embodiment, the system 100 includes an API integration module 102 central to the system 100. In particular embodiments, the API integration module 102 is a software configuration installed on one or more servers or nodes in the computing network of the system 100 for ingesting APIs and creating federated APIs. As mentioned above, the API integration module 102 allows for one or more components that typically communicate with applications via unique APIs to transmit data, request data, and receive data, according to a federated API that is independent of the unique APIs generally required for such communication.

As shown in the present embodiment, the API integration module 102 is operatively connected to one or more applications 104 (independently labeled 104A, 104B, and 104N), as well as one or more components 106 (e.g., remote systems 106A, databases 106B, computing systems 106C, "virtual" devices, etc.) over a communications network 108. In one embodiment, the one or more applications 104 may be applications such as mobile applications, web servers, or any other types of computer aided applications that transmit and receive electronic communications via an API. For example, consider that application 104A is a social media application (e.g., Twitter). In various embodiments, the application 104A may send API calls, such as data requests, to the remote systems 106A for data relating to a particular trending topic to be displayed to a user. According to various aspects of the present disclosure, the API call from the application 104A is converted or transformed at the API integration module 102 into a language-agnostic representation of the API call based at least in part on the determined recipient of the API call.

In one embodiment, the network 108 may be, but is not limited to, the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hosts, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

In various embodiments, the API integration module 102 encompasses various software layers and modules, such as a broker layer 110 for maintaining the language-agnostic representations of one or more ingested APIs. In a particular embodiment, the broker layer 110 may encompass various software layers and modules of its own, such as the entity layer 112. According to various aspects of the present disclosure, the language-agnostic representations of the one or more ingested APIs are shown in the present embodiment within the entity layer 112 and referred to herein as entities 114. In one embodiment, one or more entities 114 are preconfigured software objects, or models, that may be uniquely instantiated to represent particular devices, service models, topologies, etc., based on their APIs. In particular embodiments, models or frameworks of the one or more entities 114 may be stored locally within the API integration module 102 or in an entity database 116. In some embodiments, the entity database may be included in the API integration module 102, or the entity database 116 may be separate (e.g., remote) from the API integration module 102. According to various aspects of the present disclosure, the entity database 116 includes entity models and hierarchies 118 for instantiating entities 114 based on the detected components and devices within the system 100, and their corresponding APIs. The entity models and hierarchies 118 will be discussed further below in the description of FIG. 2.

Continuing with FIG. 1, and according to one embodiment, the API integration module 102 may also include a business logic module 120, one or more adapters 122, and an adapter router 124. According to various aspects of the present disclosure, the business logic module 120, the one or more adapters 122, and the adapter router 124, generally function near the edge of the API integration module 102, meaning that the modules are configured to intercept, convert, and route API calls received from the one or more applications 104 or the one or more components 106. According to various aspects of the present disclosure, the business logic module 120 is operatively connected to the entity layer 112 and is configured to receive API calls from the one or more applications 104 over the network 108. In certain embodiments, and in response to receiving an API call from the one or more applications 104, the business logic module 120 may determine the type of API call received and further transform the received API call into a language-agnostic representation of the API call. As will be discussed in greater detail below in the description of FIG. 4, in response to transforming the received API call into a language-agnostic representation of the API call, the language-agnostic message is routed to an adapter.

In one embodiment, the one or more adapters 122 are software modules configured to operatively connect to the one or more components 106. In some embodiments, the operative relationship between the one or more adapters 122 and the one or more components 106 is analogous to a port (adapter 122) for accepting a corresponding plug (component 106). According to various aspects of the present disclosure, the one or more adapters 122 may be component-specific, or may be operable to accept a plurality of components 106, and the one or more adapters 122 are configured to serve as a gateway between the API integration module 102 and the one or more components 106. In a particular embodiment, an API call from an application 104 with the destination of the database 106B will first be routed to the particular adapter 122 that corresponds to the database 106B. Furthermore, and according to certain embodiments, the adapter 122 may convert the API call from the language-agnostic representation to the unique API format of the database 106B prior to routing the API call.

In various embodiments, the adapter router 124 included within the broker layer 110 is configured to determine which of the one or more adapters may receive a particular language-agnostic API call. In one embodiment, during the adapter registration process, which will be described in greater detail below in the discussion of FIG. 3, the one or more adapters 122 are mapped (e.g., via unique identifiers) to the one or more instantiated entities 114 for API routing.

Figure 2:
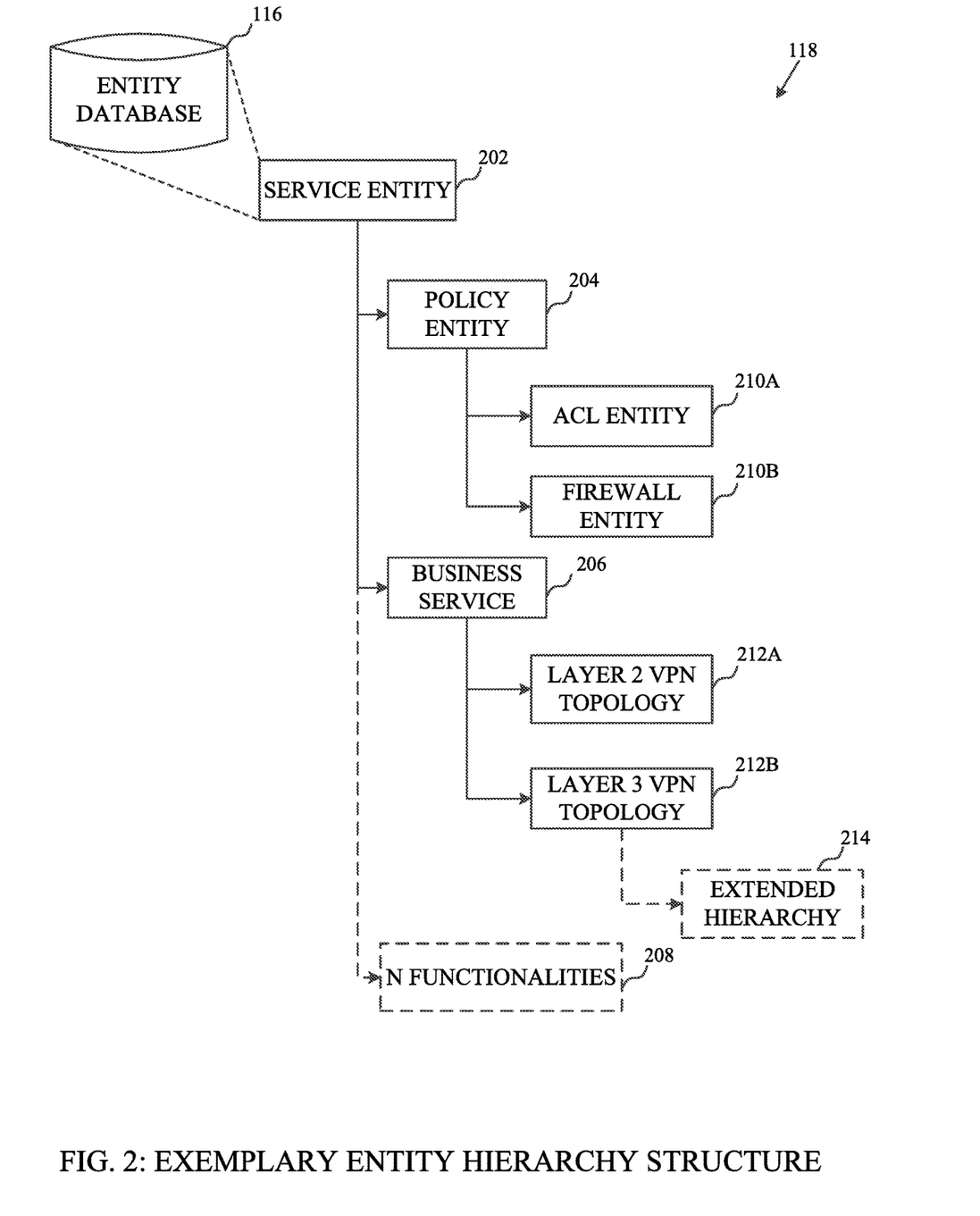
FIG. 2 illustrates an exemplary entity hierarchy structure, according to one aspect of the present disclosure.

FIG. 2 illustrates an exemplary entity hierarchy structure (e.g., entity models and hierarchies 118), according to one embodiment of the present disclosure. In various embodiments, and mentioned in the discussion of FIG. 1 above, the entity database 116 may include entity models and hierarchies 118 for instantiating the one or more entities 114. In one embodiment, entities 114 are preconfigured software objects, or models, that may be uniquely instantiated to represent particular devices (physical and virtual), service models, topologies, network components, etc., based on their APIs. In other words, entity models and hierarchies 118 are potential blueprints that define the downstream functionality available to entities 114 and how entities 114 may be instantiated.

As shown in the present embodiment, a model and hierarchy 118 for an exemplary service entity 202 is included within the entity database 116 (indicated by the dashed lines), according to one aspect of the present disclosure. It should be understood that the use of a service entity in the present embodiment is exemplary, non-limiting, and for illustrative purposes only, and any other entity model (e.g., device, topology, user, etc.) can be appropriately substituted. In various embodiments, a service entity 202 may encompass API functionality (e.g., various tiers and layers of functionality) for software applications, SaaS products, etc. As shown in the present embodiment, an instantiated service entity 202 may include or inherit a policy entity 204 and business services 206, as defined by the service entity 202 hierarchy. Also shown in the present embodiment is the service entity 202 including "N functionalities" 208, which may allow for the functionality of the service entity 202 to be extended to support various applications 104 and components 106 not currently supported, if necessary, which will be described in further detail in the discussion of FIG. 3. Continuing with the description of FIG. 2, and looking further down the policy entity 204 branch, is both an ACL (Access Control List) entity 210A and a firewall entity 210B. According to various aspects of the present disclosure, both the ACL entity 210A and the firewall entity 210B are inherited when a service entity is instantiated, and including both the ACL entity 210A and firewall entity 210B provides the system with additional security functionality offered by ACLs and firewalls, such as controlling network traffic.

In one embodiment, and for illustrative purposes only, extending from the business services 206 branch is a Layer 2 VPN (virtual private network) topology 212A as well as a Layer 3 VPN topology 212B. According to various aspects of the present disclosure, inheriting both the Layer 2 VPN topology 212A and the Layer 3 VPN topology 212B allows for the service entity to include both sets of functionality when managing VPNs. Furthermore, and according to a particular embodiment, the functionality of the Layer 3 VPN topology 212B can be extended (see extended hierarchy 214) to include additional aspects that may not be available in the already included Layer 3 VPN topology 212B, such as specific routing rules.

According to various aspects of the present disclosure, the extendable hierarchy structure shown in the present embodiment allows for the system 100 to operate dynamically and with flexibility. Moreover, and according to one embodiment, this hierarchical structure makes it possible so that if a new component 106, that is similar in most ways but still different than a preexisting component with an already instantiated entity 114, is detected within the system 100, the system 100 may extend the entity model (see 214) relating to the previously instantiated entity 114 to support the new component. In some embodiments, a virtually infinite number of extensions may be augmented to an entity model to support various detected network components, as appropriate.

Figure 3:
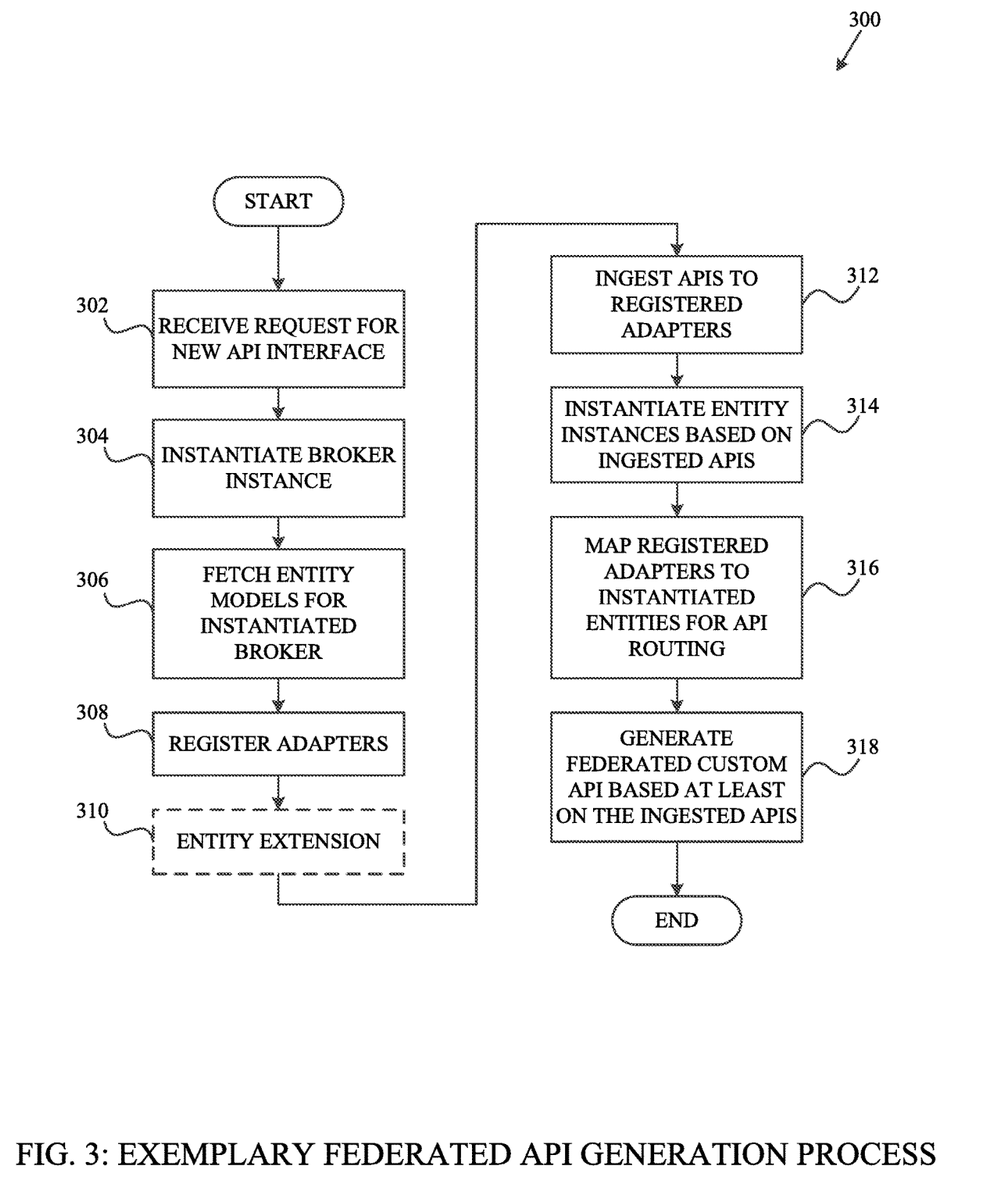
FIG. 3 is an exemplary federated API generation process, according to one aspect of the present disclosure; and, FIG. 4 is an exemplary API routing process, according to one aspect of the present disclosure.

Looking now at FIG. 3, a flowchart of the exemplary federated API generation process 300 is shown, according to one aspect of the present disclosure. In various embodiments, the federated API generation process 300 generally includes instantiating and configuring the broker layer 110, and other components included in the API integration module 102, for ingesting APIs from the one or more components 106. Furthermore, and in particular embodiments, entity instances 114 are instantiated based on the registered adapters 122 and the APIs they ingest. In certain embodiments, the entity instances 114 are mapped to the registered adapters 122 for routing received API calls (at the business logic module 120) according to a federated API. These and other aspects of the exemplary federated API generation process 300 will be described in greater detail below.

In one embodiment, the federated API generation process 300 begins at step 302, when a request is received for a new API interface, or a federated API. In various embodiments, the request for a new API interface is received at the API integration module 102 and may be requested by the one or more components 106, the one or more applications 104, an administrator of the system 100, etc. In a particular embodiment, a request for a new API interface initiates within the system 100 API support for a new component (e.g., a remote system 106) so that communications to and from that new component can be included in and supported by the federated API.

At step 304, and in response to receiving a request for a new API interface, an instance of the broker layer 110, or "broker instance", is instantiated, according to one embodiment. Mentioned previously in the discussion of FIG. 1, and according to one embodiment, the broker layer 110 is a software layer for managing the direction and flow of federated API calls within the system 100. In a particular embodiment, the broker layer includes one or more entities 114 in an entity layer 112, each entity 114 configured to map to at least one of the one or more components 106 via an adapter 122. In some embodiments, instantiating the broker instance 110 may include executing a set of computer-executable instructions for generating a particular instance of a broker model. In certain embodiments, the model for a broker layer 110 may be preconfigured to expect the later instantiation of particular entities 114.

According to various aspects of the present disclosure, at step 306, entity models are fetched for populating the instantiated broker layer 110. In one embodiment, the entity models are frameworks for the one or more entities 114, and fetching entity models at step 306 allows for the one or more entities 114 to be instantiated later during the process 300. In a particular embodiment, the fetched entity models may be a preconfigured set of possible entity models (e.g., all available entity models), or the fetched entity models may correspond to a specific or customized set of entity models for supporting particular components 106 (e.g., only entity models for certain devices and service models).

At step 308, and in one embodiment, the adapters 122 included in the API integration module 102 are registered. Referring back to the discussion of FIG. 1, one or more adapters 122 are included within the API integration module 102, the one or more adapters 122 serving as a gateway or point of communication between the one or more components 106 and the API integration module 102. In a particular embodiment, the one or more adapters 122 are each associated with at least one of the one or more components 106 for receiving and transmitting electronic communications, such as API calls, to and from the one or more components 106. For example, a particular adapter 122 included in the one or more adapters 122 (e.g., Adapter 1, as shown in FIG. 1) may be configured to receive and transmit API calls to and from a particular router manufactured by Nokia. In various embodiments, the registration of the adapters at step 308 includes determining the one or more components, such as the router manufactured by Nokia, that are present within the computer network and to further configure the adapters for receiving API calls from those types of components 106.

In a certain embodiments, an optional step in the federated API generation process 300 is step 310, in which entities are "extended" to include additional functionalities corresponding to the underlying components that they represent. In one embodiment, entity extension allows for the entity models to be augmented to in response to an API call or detected component 106 that is not supported by the current entity models. For example, and referring back to the embodiment shown in FIG. 2, the model for a service entity 202 may include a policy entity component 204 as well as business services 208 including Layer 2 VPN topology 210A and Layer 3 VPN topology 210B. According to various aspects of the present disclosure, if a service entity were instantiated according to the above described framework hierarchy, each of the aspects of the hierarchy would be inherited. However, and according to various embodiments, if it is determined that a particular component may require additional support or functionality from an entity model, the model may be augmented to, or extended, as illustrated in the extended hierarchy 214 in FIG. 2. In one embodiment, the extended entity model may be an entirely new and separate entity model from the previously fetched models, and the extension may allow for additional services and topologies to be included in the entity model, as well as allow further the entities 114 to be instantiated from the new model. In some embodiments, the preexisting entities may be extended instead of generating a new entity model.

In a particular embodiment, at step 312, the APIs from the one or more components 106 are ingested via the registered adapters 122. In one embodiment, API ingestion includes accepting or receiving one or more API function calls from the one or more components 106 for analyzing particular aspects of the API calls. For example, API ingestion at an adapter 122 operatively connected to a server (e.g., remote system 106A) may determine information from a server API call indicating that the API call typically includes one or more destination IP addresses, commands for reading or writing data, particular MAC addresses, etc., and generally that the API call is a "server API call." According to various aspects of the present disclosure, the one or more adapters may ingest the one or more API function calls and further generate a language-agnostic (e.g., JSON) representation of the API call. In a particular embodiment, the language-agnostic representation of the API call is a schema for how an entity should be instantiated in order to support the component 106 corresponding to the API call. In some embodiments, the system may generate a language-agnostic representation of an API call in a format that is similar to JSON, but aspects of the format may be customized or extended to provide capabilities not available in traditional JSON.

According to various aspects of the present disclosure, at step 314, one or more entity instances 114 are instantiated based on at least the APIs ingested at step 312. In one embodiment, the language-agnostic representations of the ingested APIs generated at step 312 may include parameters for instantiating the one or more entity instances 114. For example, a language-agnostic representation of an API call from a component 106 may include information such as IP addresses, data packet destinations, MAC addresses, etc. Accordingly, and according to one embodiment, a "device entity" may be instantiated with the particular parameters of the generated schema to support API calls from the particular component. In various embodiments, various types of entities may be instantiated such as device entities, service model entities, user entities, topology entities, etc. In a particular embodiment, entities are instantiated with particular parameters to represent, for example, the one or more components 106 corresponding to APIs ingested from the one or more components 106.

In one embodiment, at step 316 the registered adapters are mapped to the instantiated entities for API routing. In various embodiments, adapter mapping includes configuring the adapter router 124 for directing various API calls between the one or more components 106 and the broker layer 110. In certain embodiments, each adapter 122 includes instructions for routing API calls to the broker layer 110 via the adapter router 124 based in part on the particular APIs corresponding to the one or more components 106.

Proceeding to step 318, a federated custom API is generated based at least on the ingested APIs. According to various embodiments, the federated API is a system-universal API that encompasses and supports each individual API ingested at the one or more adapters 122. In one embodiment, the federated API may allow for the components and modules included in the system 100 to communicate according to one API, rather than each component or module requiring a unique API. For example, the federated API may allow for an API call from a router that typically includes a unique format to be represented and transmitted within the system 100 in a universal format understood by each module of the system 100 (e.g., the federated API indicates the action the API call is requesting, and its corresponding entity 114). In various embodiments, the federated API format may be used to communicate API calls within the system 100, but when federated API calls are received at either the business logic module 120 or the one or more adapters 122, the federated API format may be translated or transformed into the particular unique API format of the intended destination application 104 or component 106.

Figure 4:
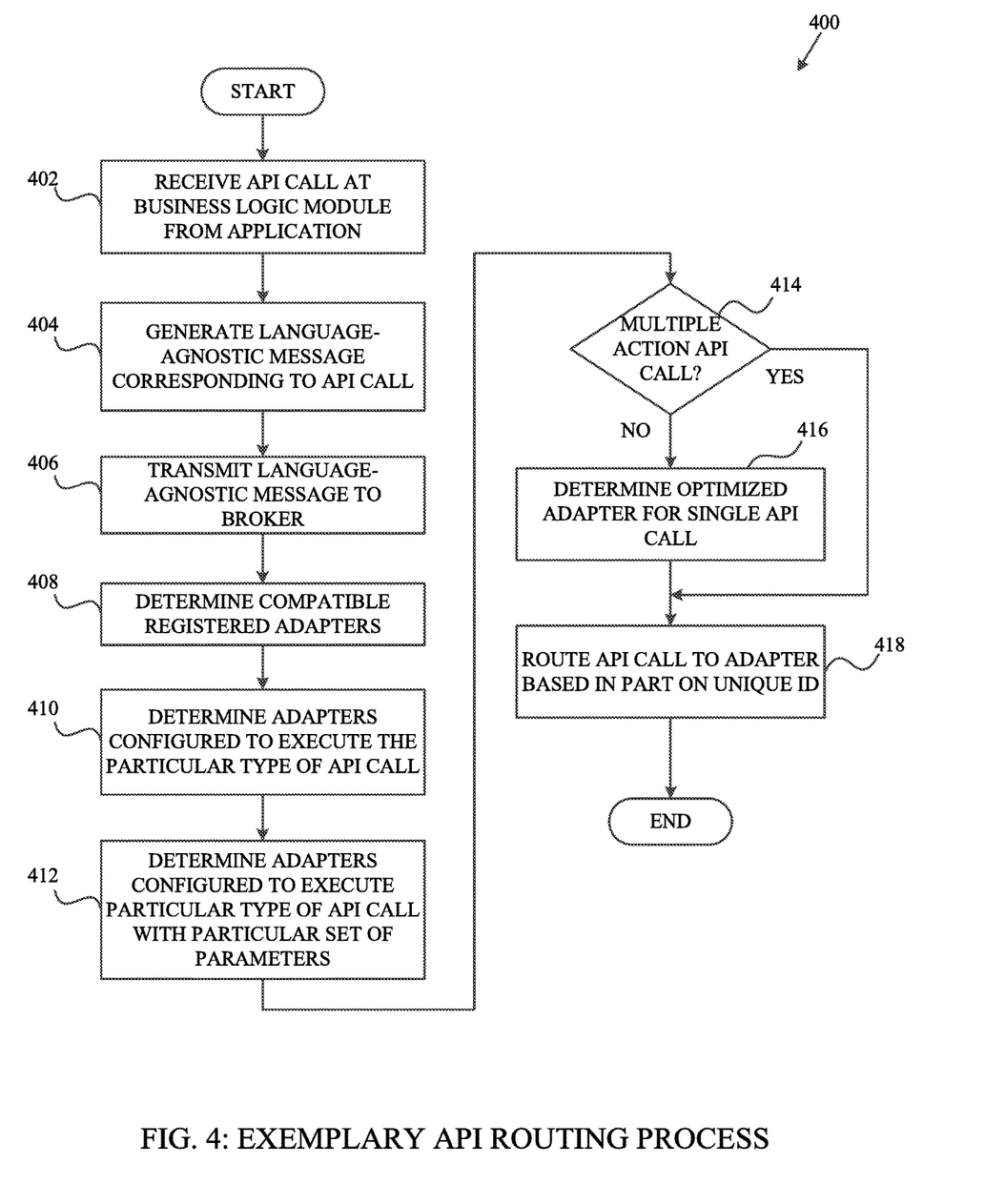

Looking now at FIG. 4, a flowchart illustrating the exemplary API routing process 400 is shown, according to one aspect of the present disclosure. In one embodiment, the API routing process 400 is capable of being performed after completion of the exemplary federated API generation process 300. According to various aspects of the present disclosure, the API routing process 400 includes receiving API calls from the one or more applications 104 and, via the federated API and instantiated entities 114, determine which adapter 122 is to receive the API call for further transmitting the API call to the one or more components 106.

In one embodiment, at step 402 the exemplary API routing process begins when an API call is received at the business logic module 120 from at least one of the one or more applications 104. In various embodiments, the API call received at the business logic module 120 may be formatted according to the transmitting application 104 and/or the destination component 106. In certain embodiments, examples of API calls being received at the business logic module 120 may include API calls from applications such as Twitter to retrieve data relating to trending social media topics, or a particular SaaS application retrieving analytic data from a remote server, etc.

Proceeding now to step 404, the business logic module 120 may generate a language-agnostic message corresponding to the received API call. As described previously in the discussion of FIG. 3, the federated API communicated within the system 100 is language-agnostic, similar to JSON, and encompasses the functionality of each unique API call received from the one or more applications 104 or the one or more components 106. According to various aspects of the present disclosure, generating a language-agnostic message corresponding to the API call allows for the system 100 to communicate the API call within the API integration module 102 using the federated API (e.g., indicating the action the API call is requesting, and its corresponding entity 114).

At step 406, the language-agnostic message (e.g., the federated API call) is transmitted to the broker layer 110 included within the API integration module 102. As described above in the discussion of FIG. 1, the broker layer 110 is a software layer configured to manage one or more instantiated entities 114 and further to route API calls to the appropriate adapters 122. In various embodiments, in response to receiving the federated API call at the broker layer 110, the broker layer 110 further executes and processes a series of instructions to determine the optimal adapter 122 to which the federated API call should be routed.

In one embodiment, at step 408, the broker layer 110 may determine or identify the registered adapters 122 that are compatible to accept the federated API call. For example, the federated API call may include a request to retrieve particular data from a database. According to various aspects of the present disclosure, the one or more adapters 122 associated with the one or more components 106 that allow for retrieval of data from a database may be determined to be compatible with the federated API call. However, according to various aspects of the present disclosure, each compatible adapter 122 may not be configured to execute the particular type of API call, as will be explained in greater detail below.

Step 410 includes determining the adapters 122 configured to execute the particular type of API call, according to one embodiment. For example, consider that adapter 122A and adapter 122B are both mapped to receive API calls from a "router" entity 114. In various embodiments, a router API call directed to the router entity 114 may potentially be routed to the adapter 122A, the router 122B, or both. However, the router API call may include particular parameters that may determine which adapter 122 receives the API call, as will be discussed immediately below.

In various embodiments, at step 412 the broker layer 110 determines the adapters that are configured to execute the particular type of API call with the particular set of parameters. Continuing with the example above, consider that the adapter 122A is configured to receive API calls regarding router inventory data (e.g., interfaces, ports, cards, etc.) and the adapter 122B is configured to receive API calls regarding telemetry data. According to various aspects of the present disclosure, a the broker layer 110 may determine that an API call querying available interfaces is to be routed to the adapter 122A, and an API call querying telemetry data is to be routed to the adapter 122B, despite both adapters 122 generally being operable to receive "router" API calls. In particular embodiments, this parameter-based API call routing allows for one entity 114 to map to a plurality of adapters 122 and to further route API calls to the appropriate adapters 122 based on the parameters included in the API call.

Proceeding now to step 414, the broker layer 110 determines if the federated API call represents a multiple action API call, according to one embodiment. In various embodiments, a multiple action API call may include instructions that cannot be executed in a single instruction cycle, and may require additional resources or more computing requirements than a single action API call. In response to determining that the federated API call does not represent a multiple action API call, the process may proceed to step 416 and the broker layer 110 determines the optimized adapter 122 for the single API call. If it is determined that the federated API call does represent a multiple action API call, the process may proceed directly to step 418. In one embodiment, step 418 includes the ultimate routing of the federated API call to the optimal adapter based in part on a unique ID included in the adapter router 124 mapping.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system for enhancing computer networks via distributed API federation, comprising:
    an entity database comprising one or more entities corresponding to frameworks for modeling device APIs; and
    an API integration module comprising one or more processors and further comprising a non-transitory memory with computer implementable instructions stored therein, wherein the API integration module via the one or more processors is operatively connected to one or more network system components and one or more applications, wherein the one or more applications are configured to direct electronic communications in the form of API calls to the one or more network system components through the API integration module, wherein the API integration module further comprises:
        a business logic module comprising respective business logic instructions of the computer implementable instructions stored in the non-transitory memory, wherein in response to the one or more processors executing the respective business logic instructions, the business logic module is operatively configured to, via the one or more processors, (i) receive an API call from a respective application of the one or more applications and (ii) generate a language-agnostic representation of the API call;
        a broker module comprising respective broker instructions of the computer implementable instructions stored in the non-transitory memory, wherein in response to the one or more processors executing the respective broker instructions, the broker module is operatively configured to, via the one or more processors, route the API call to the one or more network system components, wherein prior to completion of routing the API call, the broker module is further operatively configured to: (i) receive the language-agnostic representation of the API call from the business logic module, (ii) retrieve the one or more entities from the entity database, wherein the one or more entities are representative of the one or more network system components and are instantiated from one or more entity models based on ingested APIs associated with the one or more network system components, and (iii) determine at least one entity appropriate for addressing the API call based on the one or more entities; and
        one or more adapter modules operatively mapped to each of the one or more network system components based on the ingested APIs associated with the one or more network system components, wherein the one or more adapter modules comprise respective adapter instructions of the computer implementable instructions stored in the non-transitory memory, and wherein in response to the one or more processors executing the respective adapter instructions, the one or more adapter modules are operatively configured to, via the one or more processors, (i) receive the language-agnostic representation of the API call from the broker module, wherein prior to receiving the language-agnostic representation of the API call, the broker module determines (a) from the one or more adapter modules, one or more compatible adapter modules operatively configured to address the language-agnostic representation of the API call type, (b) from the one or more compatible adapter modules, one or more specialized adapter modules operatively configured to address a particular action associated with the language-agnostic representation of the API call, and (c) from the one or more specialized adapter modules, an optimized adapter module operatively configured to address the language-agnostic representation of the API call and a set of parameters associated with the language-agnostic representation of the API call, and wherein the optimized adapter module is mapped to at least one network system component operable to execute a particular set of API instructions associated with the language-agnostic representation of the API call, (ii) transform the language-agnostic representation of the API call into a format acceptable by the at least one network system component, the at least one network system component corresponding to the at least one entity appropriate for addressing the API call, wherein the format acceptable by the at least one network system component is based on an initial received format corresponding to an initial API call from the at least one network system component, the initial API call comprising an initial set of parameters corresponding to the set of parameters associated with the language-agnostic representation of the API call, and (iii) transmit the transformed API call to the at least one network system component.

2. The system of claim 1, wherein in the one or more entities are further representative of service models and topologies.

3. The system of claim 1, wherein the language-agnostic representation of the API call comprises an API action and a corresponding entity.

4. The system of claim 1, wherein the language-agnostic representation of the API call comprises a JSON representation.

5. The system of claim 1, wherein the one or more network system components are physical or virtual.

6. The system of claim 1, wherein a particular entity of the one or more entities may correspond to more than one of the one or more adapter modules.

7. The system of claim 6, wherein the particular entity is mapped to the one or more adapter modules via an adapter router in the broker module, wherein the adapter router comprises respective adapter router instructions of the computer implementable instructions stored in the non-transitory memory, and wherein the particular entity is mapped to the one or more adapter modules in response to the one or more processors executing the respective adapter router instructions.

8. The system of claim 1, wherein the frameworks are extendable, thereby allowing the one or more entities to dynamically configure to newly ingested APIs, wherein dynamically configuring to newly ingested APIs comprises extending the frameworks to include additional service models and/or topologies within the one or more entities.

9. A method for routing API calls between a plurality of applications and a plurality of network system components via an API integration module, the API integration module comprising one or more processors and further comprising a non-transitory memory with computer implementable instructions stored therein that, when executed by the one or more processors, cause the one or more processors to execute the steps of:

receiving an API call from one of the plurality of applications, wherein the API call comprises an electronic request for action at one of the plurality of network system components;

generating a language-agnostic representation of the API call based at least on the electronic request for action;

based on the language-agnostic representation of the API call, determining, via a broker module comprised within the API integration module, at least one respective network system component compatible to receive the API call, wherein the broker module comprises respective broker instructions of the computer implementable instructions stored in the non-transitory memory, wherein in response to the one or more processors executing the respective broker instructions, the broker module is operatively configured to, via the one or more processors, route the API call to the at least one respective network system component, and wherein prior to completion of routing the API call, the broker module is further operatively configured to, via the one or more processors: (i) receive the language-agnostic representation of the API call, (ii) retrieve one or more entities from an entity database, wherein the one or more entities are representative of the plurality of network system components and are instantiated from one or more entity models based on ingested APIs associated with the plurality of network system components, and (iii) determine at least one entity appropriate for addressing the API call based on the one or more entities, (iv) determine, from one or more adapter modules comprised within the API integration module and comprising respective adapter instructions of the computer implementable instructions stored in the non-transitory memory, one or more compatible adapter modules operatively configured to address the language-agnostic representation of the API call type, (v) determine, from the one or more compatible adapter modules, one or more specialized adapter modules operatively configured to address a particular action associated with the language-agnostic representation of the API call, and (vi) determine an optimized adapter module from the one or more specialized adapter modules, wherein the one or more adapter modules are operatively mapped to the plurality of network system components, wherein the optimized adapter module is operatively configured to address the language-agnostic representation of the API call and a set of parameters associated with the language-agnostic representation of the API call, and wherein the optimized adapter module is mapped to the at least one respective network system component operable to execute a particular set of API instructions associated with the language-agnostic representation of the API call;

transforming the language-agnostic representation of the API call into a format acceptable by the at least one respective network system component, wherein the format acceptable by the at least one respective network system component is based on an initial received format associated with an initial API call from the at least one respective network system component, the initial API call comprising an initial set of parameters corresponding to the set of parameters associated with the language-agnostic representation of the API call; and routing the transformed API call to the at least one respective network system component.

10. The method of claim 9, wherein determining the at least one respective network system component compatible to receive the API call further comprises determining that the at least one respective network system component is configured to execute the API call.

11. The method of claim 9, wherein the language-agnostic representation of the API call is a JSON representation.

12. The method of claim 9, wherein the one or more network system components are physical or virtual.

13. The system of claim 1, wherein the at least one entity comprises a particular hierarchy of functionalities for addressing the API call, the particular hierarchy of functionalities is inherited from a full hierarchy of functionalities corresponding to a respective entity model of the one or more entity models and associated ingested APIs.

14. The method of claim 9, wherein the at least one entity comprises a particular hierarchy of functionalities for addressing the API call, the particular hierarchy of functionalities is inherited from a full hierarchy of functionalities corresponding to a respective entity model of the one or more entity models and associated ingested APIs.

* * * * *